(12) United States Patent
Itou

(10) Patent No.: US 11,131,237 B2
(45) Date of Patent: Sep. 28, 2021

(54) VARIABLE NOZZLE UNIT, TURBOCHARGER, AND METHOD FOR MANUFACTURING VARIABLE NOZZLE UNIT

(71) Applicant: IHI Corporation, Koto-ku (JP)

(72) Inventor: Koutarou Itou, Koto-ku (JP)

(73) Assignee: IHI Corporation, Koto-ku (JP)

( * ) Notice: Subject to any disclaimer, the term of this patent is extended or adjusted under 35 U.S.C. 154(b) by 123 days.

(21) Appl. No.: 16/090,984

(22) PCT Filed: Mar. 27, 2017

(86) PCT No.: PCT/JP2017/012318
§ 371 (c)(1),
(2) Date: Oct. 3, 2018

(87) PCT Pub. No.: WO2017/175615
PCT Pub. Date: Oct. 12, 2017

(65) Prior Publication Data
US 2019/0136756 A1    May 9, 2019

(30) Foreign Application Priority Data
Apr. 4, 2016  (JP) .............................. JP2016-075036

(51) Int. Cl.
*F02B 37/24*    (2006.01)
*F01D 17/16*    (2006.01)
(Continued)

(52) U.S. Cl.
CPC .............. *F02B 37/24* (2013.01); *B21D 39/00* (2013.01); *B21D 53/78* (2013.01); *B21J 5/08* (2013.01);
(Continued)

(58) Field of Classification Search
CPC .......... F02B 37/24; F01D 17/16; F01D 25/24; Y10T 29/49799; Y10T 29/4981; Y10T 29/49812; B21J 15/00–08
(Continued)

(56) References Cited

U.S. PATENT DOCUMENTS 3,058,211 A * 10/1962 Axtell ..................... B21K 25/00
                                                        29/509
4,339,871 A *  7/1982 Magnaghi ................. H02K 5/15
                                                        29/596
(Continued)

FOREIGN PATENT DOCUMENTS

CN        101012772 A      8/2007
CN        102828785 A     12/2012
(Continued)

OTHER PUBLICATIONS

International Search Report dated Jun. 20, 2017 in PCT/JP2017/012318, 2 pages.

*Primary Examiner* — Woody A Lee, Jr.
*Assistant Examiner* — Brian O Peters
(74) *Attorney, Agent, or Firm* — Oblon, McClelland, Maier & Neustadt, L.L.P.

(57) ABSTRACT

A variable nozzle unit includes: a connection pin which includes a shaft; a support ring which is provided with a first through-hole; and a nozzle ring which is provided with a second through-hole, in which the shaft is inserted through the first through-hole and the second through-hole, one end of the shaft is provided with a flange portion having a diameter larger than that of the second through-hole and the other end of the shaft is provided with a head portion having a diameter larger than that of the first through-hole, the flange portion is in contact with the nozzle ring, and an elastic member that urges the support ring toward the nozzle
(Continued)

ring is disposed between the head portion and the support ring.

10 Claims, 4 Drawing Sheets

(51) Int. Cl.
- *F01D 25/24* (2006.01)
- *B21D 53/78* (2006.01)
- *B21J 5/08* (2006.01)
- *F02B 39/00* (2006.01)
- *F01D 17/10* (2006.01)
- *B21D 39/00* (2006.01)
- *F01D 25/00* (2006.01)

(52) U.S. Cl.
CPC ............. *F01D 17/10* (2013.01); *F01D 17/16* (2013.01); *F01D 25/00* (2013.01); *F01D 25/24* (2013.01); *F02B 39/00* (2013.01); *Y02T 10/12* (2013.01)

(58) Field of Classification Search
USPC ........................................ 29/505, 521, 524.1
See application file for complete search history.

(56) References Cited

U.S. PATENT DOCUMENTS

| | | | | |
|---|---|---|---|---|
| 5,316,422 A | * | 5/1994 | Coffman | B21J 15/022 |
| | | | | 411/107 |
| 5,829,933 A | * | 11/1998 | Kramer | F16B 39/24 |
| | | | | 411/156 |
| 8,061,976 B2 | * | 11/2011 | Hall | B23P 19/084 |
| | | | | 415/160 |
| 2007/0175216 A1 | | 8/2007 | Kobayashi | |
| 2010/0202874 A1 | | 8/2010 | Hayashi et al. | |
| 2012/0017417 A1 | * | 1/2012 | Denslow | B29C 65/601 |
| | | | | 29/524.1 |
| 2013/0036733 A1 | | 2/2013 | Severin et al. | |
| 2014/0241858 A1 | | 8/2014 | Tashiro et al. | |
| 2014/0248135 A1 | * | 9/2014 | Inoue | F01D 17/165 |
| | | | | 415/150 |
| 2014/0248137 A1 | | 9/2014 | Inoue et al. | |
| 2014/0341761 A1 | | 11/2014 | Severin et al. | |
| 2015/0308330 A1 | | 10/2015 | Arnold et al. | |
| 2016/0265484 A1 | * | 9/2016 | Annati | F02C 6/12 |
| 2017/0058764 A1 | | 3/2017 | Bayod et al. | |
| 2017/0298813 A1 | | 10/2017 | Ikeda et al. | |

FOREIGN PATENT DOCUMENTS

| | | | |
|---|---|---|---|
| CN | 102926872 A | | 2/2013 |
| DE | 10 2007 040 679 A1 | | 3/2009 |
| DE | 11 2015 004 533 T5 | | 7/2017 |
| DE | 11 2015 002 811 T5 | | 9/2017 |
| EP | 1 674 668 A2 | | 6/2006 |
| GB | 232611 | * | 6/1905 |
| JP | 60-126736 U | | 8/1985 |
| JP | 63-193132 U | | 12/1988 |
| JP | 2004-278532 A | | 10/2004 |
| JP | 2006-177318 A | | 7/2006 |
| JP | 2009-144615 A | | 7/2009 |
| JP | 2010-144933 A | | 7/2010 |
| JP | 2011-85054 A | | 4/2011 |
| JP | 2011-179682 A | | 9/2011 |
| JP | 2013-68153 A | | 4/2013 |
| JP | 2013-130133 A | | 7/2013 |
| JP | 2014-169840 A | | 9/2014 |
| JP | 2015086955 | * | 5/2015 |
| JP | 2016-3565 A | | 1/2016 |

* cited by examiner

VARIABLE NOZZLE UNIT, TURBOCHARGER, AND METHOD FOR MANUFACTURING VARIABLE NOZZLE UNIT

TECHNICAL FIELD

The present disclosure relates to a variable nozzle unit, a turbocharger, and a method for manufacturing a variable nozzle unit.

BACKGROUND ART

Conventionally, as a variable nozzle unit that changes an area of a flow passage of an exhaust gas supplied to a turbocharger, a variable nozzle unit including a support ring and a nozzle ring is known. For example, a variable nozzle unit disclosed in Patent Literature 1 includes a first base ring, a second base ring which is integrally formed with the first base ring by a plurality of connection pins, a plurality of variable nozzles which are disposed between the first base ring and the second base ring, and a support ring which is provided in a surface opposite to a surface facing the second base ring in the first base ring. The support ring is integrally bonded to the first base ring by caulking connection of the plurality of connection pins. Further, an outer edge of the support ring is sandwiched by a bearing housing and a turbine housing.

CITATION LIST

Patent Literature

Patent Literature 1: Japanese Unexamined Patent Publication No. 2014-169640

SUMMARY OF INVENTION

Technical Problem

In general, in the variable nozzle unit, a temperature of each of members increases due to waste heat of an internal-combustion engine. When the temperature of each of members increases too much, there is concern that the variable nozzle unit may cause deformation due to thermal expansion (radial expansion). In particular, the first base ring easily increases in temperature due to the influence of waste heat. For example, in a configuration of Patent Literature 1, since the first base ring (the nozzle ring) and the support ring are integrally bonded to each other by caulking-connection of the connection pins, the first base ring and the support ring are substantially integrally deformed. In this case, deformation due to expansion can be absorbed when the support ring slides on the bearing housing and the turbine housing in the radial direction. Here, for example, when a vehicle gasoline engine is assumed as the internal-combustion engine, there is a possibility that the waste heat temperature may further increase in the future. Correspondingly, a variable nozzle unit that stably absorbs deformation due to thermal expansion is desired.

The present disclosure describes a variable nozzle unit which stably absorbs deformation due to thermal expansion.

Solution to Problem

A variable nozzle unit according to an aspect of the present disclosure includes: a connection pin which includes a shaft; a support ring which is provided with a first through-hole; and a nozzle ring which is provided with a second through-hole, in which the shaft is inserted through the first through-hole and the second through-hole, one end of the shaft is provided with a flange portion having a diameter larger than that of the second through-hole and the other end of the shaft is provided with a head portion having a diameter larger than that of the first through-hole, the flange portion is in contact with the nozzle ring, and an elastic member that urges the support ring toward the nozzle ring is disposed between the head portion and the support ring.

Effects of Invention

According to the variable nozzle unit of the present disclosure, it is possible to stably absorb deformation due to thermal expansion.

BRIEF DESCRIPTION OF DRAWINGS

FIGS. 4(a) to 4(c) are diagrams illustrating a variable nozzle unit manufacturing step.

DESCRIPTION OF EMBODIMENTS

Figure 1:
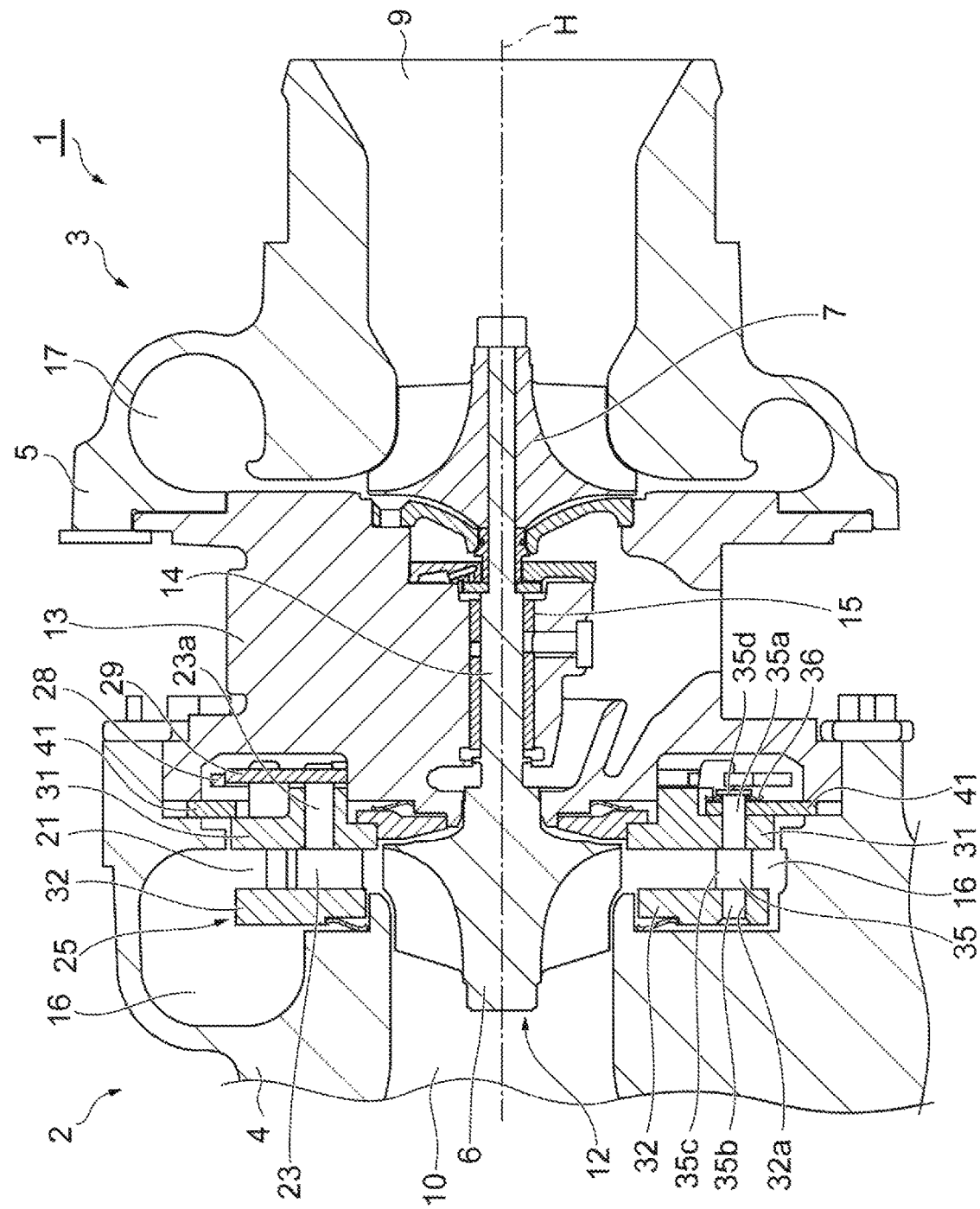
FIG. 1 is a cross-sectional view illustrating a vehicle turbocharger.

A variable nozzle unit according to an aspect of the present disclosure includes: a connection pin which includes a shaft; a support ring which is provided with a first through-hole; and a nozzle ring which is provided with a second through-hole, in which the shaft is inserted through the first through-hole and the second through-hole, one end of the shaft is provided with a flange portion having a diameter larger than that of the second through-hole and the other end of the shaft is provided with a head portion having a diameter larger than that of the first through-hole, the flange portion is in contact with the nozzle ring, and an elastic member that urges the support ring toward the nozzle ring is disposed between the head portion and the support ring.

In such a variable nozzle unit, the support ring and the nozzle ring which overlap each other are sandwiched between the head portion and the flange portion of the connection pin. A force (hereinafter, referred to as an "axial force") for clamping the support ring and the nozzle ring by the flange portion and the head portion is controlled by the urging force of the elastic member disposed between the head portion and the support ring. Since the axial force is controlled in this way, the frictional force between the support ring and the nozzle ring is controlled. Accordingly, when the nozzle ring thermally expands, the nozzle ring relatively slides on the support ring at the outside in the radial direction, it is possible to absorb deformation due to thermal expansion. Thus, it is possible to prevent a problem due to thermal expansion.

Further, the head portion may be formed by a caulking structure. According to such a configuration, since it is not necessary to provide a separate member for sandwiching the support ring and the nozzle ring, it is possible to improve bonding reliability in a sandwiched state.

Further, the elastic member may be an elastic washer through which the shaft is inserted. In the present specification, the elastic washer is a washer-shaped body having a shape of causing predetermined elasticity in the axial direction and means, for example, a spring washer, a disc spring washer, a corrugated washer, or the like.

Further, at least one of the first through-hole and the second through-hole may be an elongated hole which is long in the radial direction of the nozzle ring. In this case, it is possible to prevent the interference of the connection pin with respect to the first through-hole and the second through-hole when the nozzle ring slides on the support ring outward in the radial direction.

A method for manufacturing a variable nozzle unit includes: disposing an elastic member at the other end of a shaft protruding from a first through-hole by inserting the other end of the shaft of a connection pin with the shaft, having a flange portion formed at one end thereof to have a diameter larger than that of a nozzle ring, into the first through-hole formed in a support ring and a second through-hole formed in the nozzle ring from the nozzle ring side while the support ring and the nozzle ring overlap each other and disposing a spacer in at least one position between the flange portion and the nozzle ring, between the nozzle ring and the support ring, and between the support ring and the elastic member; and forming a head portion by caulking the other end of the connection pin after the disposing and sandwiching the elastic member, the support ring, and the nozzle ring by the head portion and the flange portion.

In such a manufacturing method, the other end of the connection pin is caulked while the spacer is disposed in at least one position between the flange portion and the nozzle ring, between the nozzle ring and the support ring, and between the support ring and the elastic member. For that reason, the elastic member that is pressed in a caulked state is restored by the thickness of the spacer in a state where only the elastic member, the support ring, and the nozzle ring are sandwiched by the head portion and the flange portion. Accordingly, the support ring and the nozzle ring are sandwiched between the head portion and the flange portion of the connection pin while being urged by the elastic member. In this way, since the spacer is disposed at a predetermined position, the variable nozzle unit can be easily manufactured.

Further, the spacer may be formed of a material disappearable at a predetermined temperature. According to this configuration, the spacer can be easily disappeared after the other end of the connection pin is caulked. In particular, when the spacer disappears due to the waste heat of the internal-combustion engine, it is possible to omit a step of removing the spacer from the manufacturing step.

Hereinafter, an embodiment according to the present disclosure will be described in detail with reference to the drawings. For convenience of description, there is a case in which the same reference numerals are given to substantially the same components and a description thereof is omitted. In the drawings, since there is a case in which the features of the components are exaggeratedly drawn, the dimensional ratio of each part on the drawing is not always the same as the actual one.

A variable displaceable turbocharger 1 illustrated in FIG. 1 is applied to, for example, an internal-combustion engine for a ship or a vehicle. As illustrated in FIG. 1, the turbocharger 1 includes a turbine 2 and a compressor 3. The turbine 2 includes a turbine housing 4 and a turbine wheel 6 accommodated in the turbine housing 4. The turbine housing 4 includes a scroll flow passage 16 which extends in the circumferential direction around the turbine wheel 6. The compressor 3 includes a compressor housing 5 and a compressor wheel 7 accommodated in the compressor housing 5. The compressor housing 5 includes a scroll flow passage 17 which extends in the circumferential direction around the compressor wheel 7.

The turbine wheel 6 is provided at one end of the rotation shaft 14 and the compressor wheel 7 is provided at the other end of the rotation shaft 14. A bearing housing 13 is provided between the turbine housing 4 and the compressor housing 5. The rotation shaft 14 is rotatably supported by the bearing housing 13 through a bearing 15 and the rotation shaft 14, the turbine wheel 6, and the compressor wheel 7 rotate as a single rotation body 12 around a rotation axis H.

The turbine housing 4 is provided with an exhaust gas inlet (not illustrated) and an exhaust gas outlet 10. An exhaust gas which is discharged from an internal-combustion engine (not illustrated) flows into the turbine housing 4 through the exhaust gas inlet, flows into the turbine wheel 6 through the scroll flow passage 16, and rotates the turbine wheel 6. Then, the exhaust gas flows to the outside of the turbine housing 4 through the exhaust gas outlet 10.

The compressor housing 5 is provided with a suction port 9 and a discharge port (not illustrated). When the turbine wheel 6 rotates as described above, the compressor wheel 7 rotates through the rotation shaft 14. The rotating compressor wheel 7 sucks external air through the suction port 9, compresses the external air, and discharges the external air through the discharge port through the scroll flow passage 17. The compressed air which is discharged from the discharge port is supplied to the above-described internal-combustion engine.

Next, the turbine 2 will be described in more detail. The turbine 2 is a variable displaceable turbine. A gas inflow path 21 which connects the scroll flow passage 16 and the turbine wheel 6 is provided with movable nozzle vanes 23. A plurality of nozzle vanes 23 are disposed in the circumferential direction about the rotation axis H. Each nozzle vane 23 rotates around the axis parallel to the rotation axis H. When the nozzle vane 23 rotates as described above, the cross-sectional area of the gas flow passage is optimally adjusted in response to the flow rate of the exhaust gas introduced into the turbine 2. As described above, the turbine 2 includes a variable nozzle unit 25 as a driving mechanism for rotating the nozzle vane 23. The variable nozzle unit 25 is fitted to the inside of the turbine housing 4 and is fixed while being sandwiched between the turbine housing 4 and the bearing housing 13.

Hereinafter, the variable nozzle unit 25 will be described in more detail with reference to FIGS. 1 to 4. In the description below, the "axial direction", the "radial direction", and the "circumferential direction" simply mean the direction of the rotation axis H, the rotational radial direction, and the rotational circumferential direction of the turbine wheel 6, respectively. In some cases, in the direction of the rotation axis H, a side (a left side in FIG. 1) near the turbine 2 is simply referred to as a "turbine side" and a side (a right side in FIG. 1) near the compressor 3 is simply referred to as a "compressor side".

The variable nozzle unit 25 includes the plurality of nozzle vanes 23 along with a first nozzle ring 31 and a second nozzle ring 32 which sandwich the nozzle vane 23 in the axial direction. Further, a support ring 41 is fixed to the compressor side of the first nozzle ring 31. Each of the first nozzle ring 31 and the second nozzle ring 32 is formed in an annular shape about the rotation axis H and is disposed to surround the turbine wheel 6 in the circumferential direction.

Figure 2:
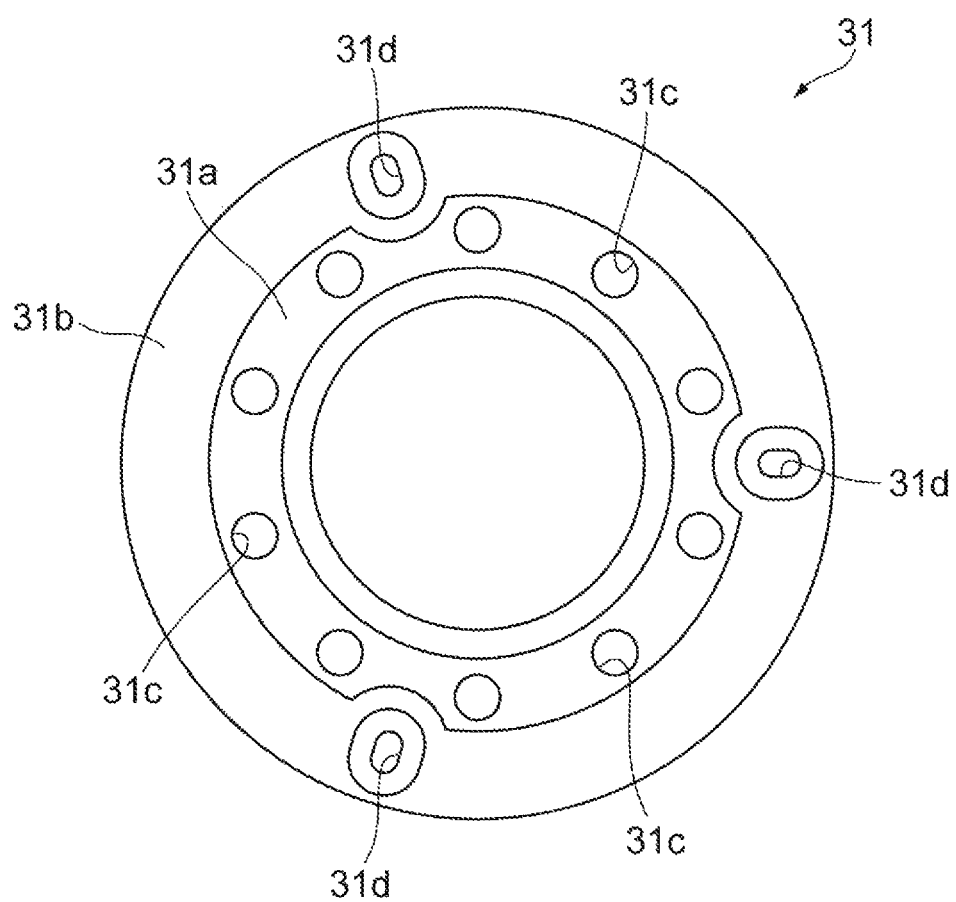
FIG. 2 is a top view illustrating a nozzle ring.

As illustrated in FIG. 2, a thick portion 31a having a large axial thickness is formed at the inside of the first nozzle ring 31 in the radial direction. A thin portion 31b having an axial thickness smaller than that of the thick portion 31a is formed at the outside of the first nozzle ring 31 in the radial direction. In the thick portion 31a, a plurality of bearing holes 31c are formed at substantially the same interval in the circumferential direction about the rotation axis H. In the example illustrated in the drawings, the bearing hole 31c is formed at ten positions in the circumferential direction. Further, in the thin portion 31b, a plurality of pin holes (second through-holes) 31d are formed at substantially the same interval in the circumferential direction about the rotation axis H. In the example illustrated in the drawings, the pin hole 31d is formed at three positions in the circumferential direction and is formed as a track-shaped elongated hole which is long in the radial direction about the rotation axis H. A rotation shaft 23a of each nozzle vane 23 is rotatably inserted through the bearing hole 31c of the first nozzle ring 31. The first nozzle ring 31 axially supports each nozzle vane 23 in a cantilevered manner. Additionally, each nozzle vane 23 may be axially supported at both ends thereof by the first nozzle ring 31 and the second nozzle ring 32.

The second nozzle ring 32 is provided to be separated from the first nozzle ring 31 in the axial direction. In the second nozzle ring 32, a plurality of pin holes 32a (see FIG. 1) are formed at a position corresponding to the pin hole 31d of the first nozzle ring 31. The connection pin 35 is inserted through the pin hole 31d of the first nozzle ring 31 and the pin hole 32a of the second nozzle ring 32. One end side of the connection pin 35 in the axial direction is provided with a columnar shaft 35a to be inserted through the pin hole 31d. The other end side of the connection pin 35 in the axial direction is provided with a columnar shaft 35b to be inserted through the pin hole 32a. Further, the shaft 35a and the shaft 35b are connected to each other by a flange portion 35c having a diameter larger than those of the shaft bodies 35a and 35b and the pin holes 31d and 32a. Additionally, in the embodiment, the shaft bodies 35a and 35b and the flange portion 35c are integrally formed. The first nozzle ring 31 and the second nozzle ring 32 are connected to be separated from each other by a predetermined distance in the direction of the rotation axis H while sandwiching the flange portion 35c. An area which is sandwiched by the first nozzle ring 31 and the second nozzle ring 32 forms the above-described gas inflow path 21.

Figure 3:
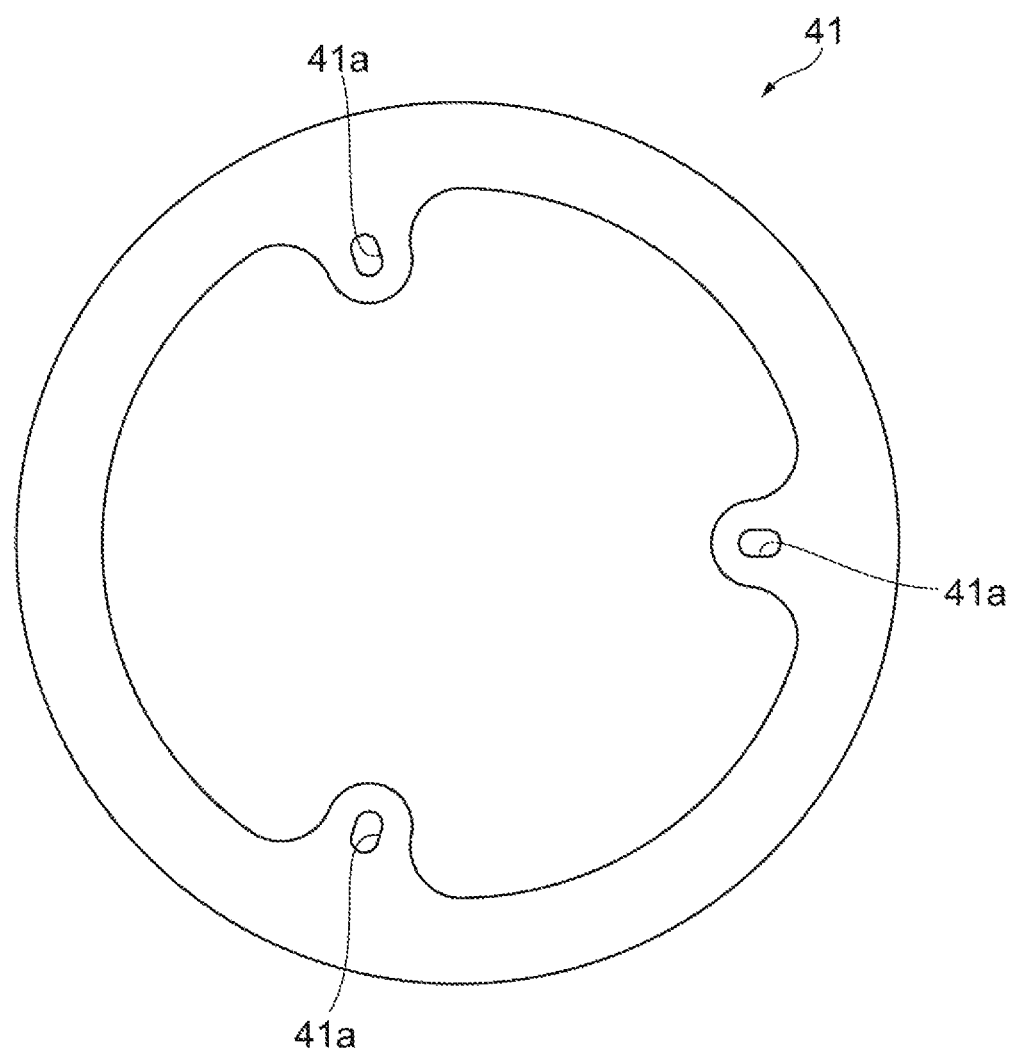
FIG. 3 is a top view illustrating a support ring.

As illustrated in FIG. 3, the support ring 41 is formed in an annular plate shape having an outer diameter larger than that of the first nozzle ring 31. In the support ring 41, a plurality of pin holes (first through-holes) 41a corresponding to the pin hole 31d of the first nozzle ring 31 are formed at substantially the same interval in the circumferential direction. The pin hole 41a in the example illustrated in the drawings is formed as a track-shaped elongated hole which is long in the radial direction about the rotation axis H. The support ring 41 is bonded to the compressor side of the first nozzle ring 31 by the connection pin 35. Since the outer peripheral portion of the support ring 41 is sandwiched between the turbine housing 4 and the bearing housing 13 in the axial direction, the entire variable nozzle unit 25 is fixed to the turbine housing 4 and the bearing housing 13.

The driving ring 28 (see FIG. 1) is supported at the compressor side of the support ring 41 to be rotatable about the rotation axis H. The driving ring 28 is a member that transmits a driving force input from the outside to the nozzle vane 23. A part of the driving ring 28 is formed of, for example, a metal material. The driving ring 28 is formed in an annular shape which extends in the circumferential direction about the rotation axis H and rotates around the rotation axis H by receiving the driving force from the outside. A lever 29 is attached to the rotation shaft 23a of each nozzle vane 23. When the driving force is input from the outside of the turbine 2 to the driving ring 28, the driving ring 28 rotates around the rotation axis H. Accordingly, each lever 29 rotates and each nozzle vane 23 rotates through the rotation shaft 23a.

Next, a bonding structure between the first nozzle ring (the nozzle ring) 31 and the support ring 41 in the variable nozzle unit 25 will be described.

As described above, the support ring 41 and the first nozzle ring 31 are bonded to each other by the connection pin 35. As illustrated in FIGS. 1 and 4(c), the shaft 35a of the connection pin 35 is inserted through the pin hole 41a and the pin hole 31d while the support ring 41 and the first nozzle ring 31 overlap each other. A diameter of the flange portion 35c of the connection pin 35 is set to be larger than a short diameter of the pin hole 31d. A turbine side surface of the first nozzle ring 31 is in contact with the flange portion 35c. Further, a compressor side end portion of the shaft 35a is provided with a head portion 35d having a diameter larger than a short diameter of the pin hole 41a.

A spring washer (an elastic washer) 36 which is an elastic member is disposed between the head portion 35d and the compressor side surface of the support ring 41. The spring washer 36 of the embodiment is formed in a disc spring shape which is curved in the radial direction and has a through-hole 36a formed at the center. That is, the spring washer 36 includes an annular outer portion 36b which is formed at the outer edge side, an inclined portion 36c which rises while being inclined inward from the inner edge of the outer portion 36b, and an annular inner portion 36d which further extends inward from the inner edge of the inclined portion 36c. The outer portion 36b is formed in, for example, a curved corrugated shape in the cross-sectional view and a part corresponding to the valley of the wave is in contact with the support ring 41. Further, the outer edge of the outer portion 36b is separated from the support ring 41. A transition portion between the inclined portion 36c and the inner portion 36d is formed at the outside in relation to the outer edge of the head portion 35d. The inner portion 36d extends in a direction substantially parallel to the support ring 41.

The shaft 35a is inserted through the through-hole 36a of the spring washer 36. The spring washer 36 is sandwiched by the head portion 35d and the compressor side surface of the support ring 41. Accordingly, the spring washer 36 urges the support ring 41 toward the first nozzle ring 31.

Next, each step of a method of bonding the first nozzle ring 31 and the support ring 41 of the variable nozzle unit will be described with reference to FIG. 4. In the embodiment, the head portion 35d is formed by caulking the shaft 35a. For that reason, as illustrated in FIG. 4(a), the head portion is not formed at the end portion of the shaft 35a at the initial time of the manufacturing step.

As illustrated in FIG. 4(a), the shaft 35a of the connection pin 35 is first inserted to the pin hole 41a of the support ring 41, a spacer 37, and the pin hole 31d of the first nozzle ring 31 from the first nozzle ring 31. In this state, the support ring 41 and the first nozzle ring 31 overlap each other while the spacer 37 is interposed therebetween. The spacer 37 is a sheet-shaped body provided with a through-hole through which the shaft 35a is insertable. The thickness of the spacer 37 is substantially uniform and a distance between the support ring 41 and the first nozzle ring 31 is kept uniform. For example, the spacer 37 can be sandwiched by the entire opposing surfaces of the support ring 41 and the first nozzle ring 31. The spacer 37 may be separately provided at three positions in the circumferential direction to be disposed only on the opposing surfaces of the support ring 41 and the first nozzle ring 31. Further, one annular spacer 37 may be provided to cross the opposing surfaces. The spacer 37 is formed of paper and can be eliminated at a predetermined temperature (for example, carbonized at 400° C.). The shaft 35a which protrudes from the pin hole 41a is inserted through the through-hole 36a of the spring washer 36. The outer portion 36b of the spring washer 36 is in contact with the support ring 41.

In the subsequent step, the end portion of the shaft 35a is pressed toward the flange portion 35c so that the head portion 35d is formed at the end portion of the shaft 35a according to a caulking structure as illustrated in FIG. 4(b). In this state, the spring washer 36, the support ring 41, the spacer 37, and the first nozzle ring 31 are sandwiched by the head portion 35d and the flange portion 35c of the connection pin 35. Further, the inner portion 36d of the spring washer 36 is crushed by the head portion 35d and the support ring 41.

Next, the spacer 37 is removed from a gap between the support ring 41 and the first nozzle ring 31. For example, when the internal-combustion engine is operated in the state of FIG. 4(b), the paper spacer 37 is carbonized by the waste heat from the internal-combustion engine to disappear. When the spacer 37 is removed, as illustrated in FIG. 4(c), a gap corresponding to the thickness of the spacer 37 is formed from the head portion 35d to the flange portion 35c. Accordingly, the spring washer 36 is restored by the thickness of the spacer 37. The spring washer 36 urges the support ring 41 toward the first nozzle ring 31 by the restoration. With the above-described step, the support ring 41 and the first nozzle ring 31 are bonded to each other by the connection pin 35 and the spring washer 36. Additionally, the spacer 37 may disappear due to means different from the waste heat of the internal-combustion engine.

Here, as described above, the spring washer 36 urges the support ring 41 toward the first nozzle ring 31 by the restoration corresponding to the thickness of the spacer 37. For the restoration that exhibits a predetermined pressing force, there is a need to pay attention so that the spring washer 36 is not abnormally deformed when the spring washer 36 is crushed by the head portion 35d and the support ring 41. In addition, the "abnormal deformation" indicates, for example, a state where the spring washer 36 is deformed to a degree that the support ring 41 cannot be urged toward the first nozzle ring 31 when the spacer 37 disappears.

In the spring washer 36 of the embodiment, a corrugated outer portion 36b is provided at the outer edge of the inclined portion 36c as an example. For that reason, a force which is generated in the spring washer 36 due to the contact with the support ring 41 can be released in the radial direction. Accordingly, it is possible to prevent the abnormal deformation of the spring washer 36 due to the contact with the support ring 41. In FIG. 4, an example in which the number of waves formed by the outer portion 36b is one has been described, but a plurality of waves may be formed. Also in this case, it is possible to prevent the abnormal deformation of the spring washer 36 due to the contact with the support ring 41. Further, in the spring washer 36 of the embodiment, the inner portion 36d which is substantially parallel to the support ring 41 is provided at the inner edge of the inclined portion 36c as an example. Accordingly, it is possible to prevent the abnormal deformation of the spring washer 36 due to the local contact with the head portion 35d.

Figure 4:
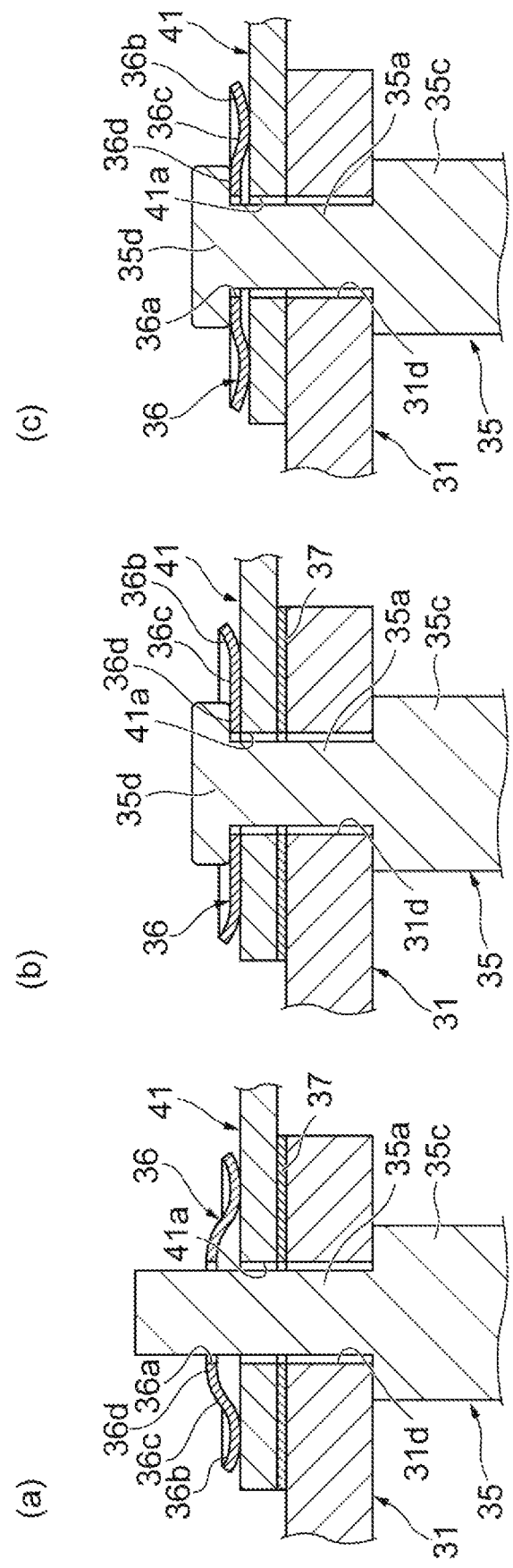
FIG. 4 is a partially enlarged schematic diagram of a variable nozzle unit, where

In FIG. 4, an example in which the transition portion (connection portion) between the inner portion 36d and the inclined portion 36c is formed at the outside in relation to the outer edge of the head portion 35d has been described, but the transition portion may be formed at the same position as that of the outer edge of the head portion 35d. Further, the transition portion may be formed at the inside in relation to the outer edge of the head portion 35d. Here, when the transition portion between the inner portion 36d and the inclined portion 36c is formed at the outside in relation to the outer edge of the head portion 35d, it is possible to avoid a local contact of the transition portion between the inner portion 36d and the inclined portion 36c with respect to the head portion 35d. Accordingly, it is possible to stably prevent the abnormal deformation of the spring washer 36.

In the above-described variable nozzle unit 25, the support ring 41 and the first nozzle ring 31 which overlap each other are sandwiched between the flange portion 35c and the head portion 35d of the connection pin 35. An axial force generated by the flange portion 35c and the head portion 35d is controlled by the urging force of the spring washer 36 disposed between the head portion 35d and the support ring 41.

For that reason, when the urging force of the spring washer 36 is adjusted, the frictional force between the support ring 41 and the first nozzle ring 31 is controlled. Accordingly, since the first nozzle ring 31 relatively slides on the support ring 41 at the outside in the radial direction even when the first nozzle ring 31 thermally expands due to an increase in waste heat temperature in the future, it is possible to stably absorb deformation due to thermal expansion.

Further, since the head portion 35d is formed by a caulking structure, it is possible to improve bonding reliability in a sandwiched state without requiring a separate member for sandwiching the support ring 41 and the first nozzle ring 31.

Further, the pin hole 31d and the pin hole 41a are formed as elongated holes which are long in the radial direction and the movement of the shaft 35a inserted through the pin hole 31d and the pin hole 41a in the radial direction is allowed. Accordingly, it is possible to prevent the interference of the connection pin 35 with respect to the pin hole 31d and the pin hole 41a when the first nozzle ring 31 slides on the support ring 41 at the outside in the radial direction.

Further, in the above-described manufacturing method, the other end of the connection pin 35 is caulked while the spacer 37 is disposed between the first nozzle ring 31 and the support ring 41. For that reason, the spring washer 36 is restored by the thickness of the spacer 37 in a state where only the spring washer 36, the support ring 41, and the first nozzle ring 31 are sandwiched by the head portion 35d and the flange portion 35c after the spacer 37 is removed. In this way, since the spacer 37 is disposed at a predetermined position, the variable nozzle unit 25 can be easily manufactured.

Further, since the spacer 37 is formed of paper, the spacer 37 can easily disappear after caulking the connection pin 35. Particularly, when the spacer 37 disappears due to the waste heat of the internal-combustion engine as described above, a step of removing the spacer 37 can be omitted from the manufacturing step. That is, the spacer 37 may disappear by the initial operation of the internal-combustion engine after the internal-combustion engine is manufactured.

Although the embodiment of the present disclosure has been described with reference to the drawings, a detailed configuration is not limited to the embodiment. For example, the spacer 37 which is formed of paper into a sheet shape has been exemplified, but the present disclosure is not limited thereto. The spacer may be formed to have a predetermined thickness and to keep a predetermined thickness at the time of caulking the shaft 35a and may be formed in a shape other than the sheet shape. Further, the spacer may be formed of a material other than paper and the material may disappear at a predetermined temperature (for example, an exhaust temperature of the internal-combustion engine). The disappearance is not only limited to disappearance by combustion (carbonization), but also includes a concept such as liquefaction, vaporization, and sublimation. Further, the disappearance includes not only a state in which the spacer is completely lost but also a state in which the thickness of the spacer is reduced to a degree that the spring washer is recovered. Further, the spacer may be formed of materials other than a material which disappears at a predetermined temperature. For example, the variable nozzle unit may be manufactured by forming a spacer by a metal foil or the like and pulling out the spacer at the time of caulking the head portion. In addition, when the spacer is formed of a material that disappears at a predetermined temperature, there is a case in which the spacer disposed in the manufacturing step is visible even after the spacer disappears in accordance with the material or the usage of the turbocharger.

Further, an example in which the spacer 37 is disposed between the first nozzle ring 31 and the support ring 41 having a wide area so that an excessive pressure is not applied to the spacer 37 at the time of caulking has been described, but the present disclosure is not limited thereto. For example, the spacer may be also disposed between the flange portion 35c and the first nozzle ring 31. Since the flange portion 35c and the first nozzle ring 31 are easily heated to a high temperature due to the influence of the heat of the exhaust gas of the internal-combustion engine, the disappearance is efficiently performed when the spacer is formed of paper or the like. Further, the spacer may be disposed between the support ring 41 and the spring washer 36.

Further, an example in which all of the pin hole 41a of the support ring 41 and the pin hole 31d of the first nozzle ring 31 are elongated holes has been described, but the present disclosure is not limited thereto. One of the pin hole 41a and the pin hole 31d may be, for example, a round hole. In this case, since the movement of the connection pin in the radial direction is regulated by the round hole, the connection pin is easily positioned. Further, both of the pin hole 41a and the pin hole 31d may be round holes instead of elongated holes. In this case, a gap in which the shaft 35a is movable with respect to at least one of the pin hole 41a and the pin hole 31d in the radial direction is provided so that the relative sliding of the first nozzle ring with respect to at least the support ring 41 is allowed.

Further, a spring washer which is one of elastic washers has been described as the elastic member, but the present disclosure is not limited thereto. As the elastic washer, for example, a spring washer, a disc spring washer, a corrugated washer, or the like can be adopted other than the spring washer and various shapes can be adopted other than the shape of the typical washer as long as predetermined elasticity can be generated in the axial direction. Further, a heat-resistant resin having predetermined elasticity may be used as the elastic member.

Further, an example in which the head portion 35d is formed by caulking the shaft 35a has been described, but the present disclosure is not limited thereto. For example, the head portion may be formed as a nut or the like and the head portion may be formed by a so-called bolt and nut connection with respect to the shaft. Further, the head portion may be formed as a separate member and may be fixed to the shaft by welding or the like. In such a case, the variable nozzle unit can be manufactured without using the spacer.

INDUSTRIAL APPLICABILITY

According to the variable nozzle unit of the present disclosure, it is possible to stably absorb deformation due to thermal expansion.

REFERENCE SIGNS LIST

1: turbocharger, 25: variable nozzle unit, 31: first nozzle ring (nozzle ring), 31d: pin hole (second through-hole), 35: connection pin, 35a: shaft, 35c: flange portion, 35d: head portion, 36: spring washer (elastic member), 37: spacer, 41: support ring, 41a: pin hole (first through-hole).

The invention claimed is:

1. A variable nozzle unit comprising:
   a connection pin which includes a shaft;
   a support ring which is provided with a first through-hole; and
   a nozzle ring which is provided with a second through-hole,
   wherein the shaft is inserted through the first through-hole and the second through-hole,
   wherein one end of the shaft is provided with a flange portion having a diameter larger than that of the second through-hole and the other end of the shaft is provided with a head portion having a diameter larger than that of the first through-hole,
   wherein the head portion has a caulking structure,
   wherein the flange portion is in contact with the nozzle ring,
   wherein an elastic washer that urges the support ring toward the nozzle ring is disposed between the head portion and the support ring, and
   wherein a distance between the head portion and the support ring is larger than a distance between two sides of the elastic washer.

2. The variable nozzle unit according to claim 1, wherein the shaft is configured to be inserted through the elastic washer.

3. The variable nozzle unit according to claim 2, wherein at least one of the first through-hole and the second through-hole is an elongated hole which is long in a radial direction of the nozzle ring.

4. A turbocharger comprising:
   the variable nozzle unit according to claim 3.

5. A turbocharger comprising:
   the variable nozzle unit according to claim 2.

6. The variable nozzle unit according to claim 1, wherein at least one of the first through-hole and the second through-hole is an elongated hole which is long in a radial direction of the nozzle ring.

7. A turbocharger comprising:
   the variable nozzle unit according to claim 6.

8. A turbocharger comprising:
   the variable nozzle unit according to claim 1.

9. A method for manufacturing a variable nozzle unit, the variable nozzle unit having a connection pin which includes a shaft, the shaft having one end and the other end, the method comprising:
   disposing an elastic member at the other end of the shaft protruding from a first through-hole by inserting the other end of the shaft, having a flange portion formed at the one end thereof to have a diameter larger than that of a nozzle ring, into the first through-hole formed in a support ring and a second through-hole formed in the nozzle ring from the nozzle ring side while the support ring and the nozzle ring overlap each other;

disposing a spacer in at least one position between the flange portion and the nozzle ring, between the nozzle ring and the support ring, and between the support ring and the elastic member;

forming a head portion by caulking the other end of the connection pin after the disposing and sandwiching the elastic member, the support ring, and the nozzle ring by the head portion and the flange portion; and removing the spacer after the head portion is formed.

10. The method for manufacturing a variable nozzle unit according to claim 9, wherein the removing includes carbonizing the spacer.

\* \* \* \* \*